(12) United States Patent
Kerrigan

(10) Patent No.: US 6,571,745 B2
(45) Date of Patent: Jun. 3, 2003

(54) DOG PACK HARNESS

(76) Inventor: Nancy C. Kerrigan, 43 Eaton Ave., Woburn, MA (US) 01801

( * ) Notice: Subject to any disclaimer, the term of this patent is extended or adjusted under 35 U.S.C. 154(b) by 0 days.

(21) Appl. No.: 10/007,345

(22) Filed: Oct. 25, 2001

(65) Prior Publication Data

US 2003/0079695 A1 May 1, 2003

(51) Int. Cl.⁷ .............................. A62B 35/00; B68B 3/10
(52) U.S. Cl. ........................ 119/858; 119/792; 119/856; 54/19.1; 54/37.1
(58) Field of Search .................. 119/729, 725, 119/770, 772, 792, 793, 795, 821, 831, 856, 863, 864, 907, 858; 54/19.1, 6.1, 37.1; 224/153, 901, 148, 148.1, 905, 901.8, 191, 184, 259; D30/135, 152, 144, 151, 153, 134; D29/124; D34/27; 24/164; 294/157; 280/13, 1.5

(56) References Cited

U.S. PATENT DOCUMENTS

| | | | |
|---|---|---|---|
| 893,199 A | * | 7/1908 | Schaller |
| 1,239,755 A | * | 9/1917 | Bader et al. |
| 3,310,034 A | | 3/1967 | Dishart |
| 3,999,521 A | | 12/1976 | Puiello |
| 4,091,766 A | | 5/1978 | Colliard |
| 4,584,967 A | | 4/1986 | Taplin |
| 4,751,923 A | | 6/1988 | Marino |
| 4,957,231 A | * | 9/1990 | Kalisher ................. 224/151 |
| D313,677 S | * | 1/1991 | Hammon ................. D30/152 |
| 5,184,762 A | | 2/1993 | Nevitt |
| D359,598 S | | 6/1995 | Forbes |
| 5,467,743 A | | 11/1995 | Doose |
| 5,474,033 A | | 12/1995 | Mitchell, Jr. |
| D367,142 S | | 2/1996 | Platt |
| 5,560,321 A | * | 10/1996 | Hess ......................... 119/858 |
| 5,632,235 A | | 5/1997 | Larsen et al. |
| 5,644,902 A | | 7/1997 | Kemp |
| 5,682,840 A | | 11/1997 | McFarland |
| 5,746,158 A | | 5/1998 | Landherr |
| 5,887,772 A | * | 3/1999 | Dooley ..................... 224/191 |
| 5,901,532 A | * | 5/1999 | Bopp ............................ 54/66 |
| 5,918,611 A | | 7/1999 | Amato |
| D429,390 S | | 8/2000 | Grady et al. |
| D429,391 S | | 8/2000 | Grady et al. |
| D434,535 S | | 11/2000 | Koch |
| D445,223 S | * | 7/2001 | Butler ..................... D30/145 |

FOREIGN PATENT DOCUMENTS

DE 3941835 A * 7/1990 ............. B68B/1/04

OTHER PUBLICATIONS

"Classi Pack" http://classiproducts.netfirms.com, 4 pages.*
gearfordogs.com, Packs, 3 pages, 1999.*

* cited by examiner

Primary Examiner—Peter M. Poon
Assistant Examiner—Andrea M. Valenti
(74) Attorney, Agent, or Firm—Lambert & Associates; Gary E. Lambert

(57) ABSTRACT

A dog pack harness providing a dog with the ability to carry various items that might become necessary or desirable to have while walking a dog. The dog pack harness is comprised of a base member positioned on the back and the sides of the dog, a plurality of pocket and holding elements for storing of various items, a ventral strap assembly means securing the base member to the dog, a dorsal strap assembly device for securing the base member to the collar, and a collar element having a slidable collar attachment wherein the color attachment is used for securing of the collar element to the dorsal strap assembly device.

21 Claims, 4 Drawing Sheets

DOG PACK HARNESS

FIELD OF THE INVENTION

This invention relates to dog harnesses and specifically to harnesses that allow dogs to carry useful items that might become necessary during walking of a dog.

BACKGROUND OF THE INVENTION

When a dog is taken for a walk, there are a number of items that many dog owners need to take along with them. Such items include a water bottle, a water dish, a dog toy, a dog brush, a bag to pick up dog droppings, and even medication for the dog. Instead of making the dog owner into a dog's accessory carrier, it is by far more convenient to let the dog carry its own equipment.

In the past, a number of solutions were provided wherein the dog was equipped with means for carrying various objects. One such solution is demonstrated in a U.S. Pat. No. 5,887,772 where supply bags could be attached to a dog harness. Another is a U.S. Pat. No. 5,664,902 where a specific strap assembly is used for maintaining packs on the dog's back.

What is lacking in the above-cited inventions is an arrangement wherein the dog pack is integrated with a collar thus allowing the dog owner to control the dog on the leash while ensuring that the loads mounted on a dog remain centered and do not slide to the sides of the dog. Another missing feature is an ability to provide a carrying means for a wide variety of items that might be desirable for storage on a dog. In addition, the disclosed invention differs in its structure and concept from the known prior art.

SUMMARY OF THE INVENTION

The present invention represents a dog pack harness that allows a dog to carry its own necessary items when it is taken for a walk thus freeing the dog owner from having to carry extra loads.

The dog pack harness is comprised of a base member, which is positioned on the back and side of a dog. There are numerous pocket elements and holding elements attached to the base member for storage of various items, which might be needed during the duration of an excursion with the dog. The base member is secured to the dog via two separate strap assembly means. The first one is a ventral strap assembly means which loops around the underside of the dog. The second one is a dorsal strap assembly means which connects the base member to the collar element. Together, the two strap assembly means ensure that the base member remains stable on the back of the dog and does not slide back or to the sides of the dog.

Since various breeds of dogs have greatly varying neck sizes, a special feature is introduced in the collar element. Normally, a collar size could be adjusted to change its diameter to accommodate varying sizes of dogs. Additionally, many dog collars have buckles. Normally the buckle is the heaviest part of the collar and it will naturally slide down to be positioned on the front of the dog's neck. However, in the present invention, the back of the collar has a collar attachment to which one end of the dorsal strap assembly means is secured. This creates a problem since a perfectly centered collar and a ventral strap assembly means would slide sideways on a different sized dog, since the buckle will move to a side due to an adjustment in the size of the collar. Therefore, a special mechanism is incorporated into the invention to allow slidability of the collar attachment along the length of the collar while allowing securing of the collar attachment to the collar at any portion of the collar.

Therefore, it is an object of the present invention to provide an improved dog pack harness.

It is another object of the present invention to provide a dog pack harness that has an ability to fit on different sized dogs while remaining centered on the body of the dog.

These and other objects and advantages of the present invention will be more apparent by reference to the following description of the invention, description of a preferred embodiment, appended claims, and accompanying drawings.

DESCRIPTION OF THE INVENTION

This invention represents a dog pack harness.

Figure 1:
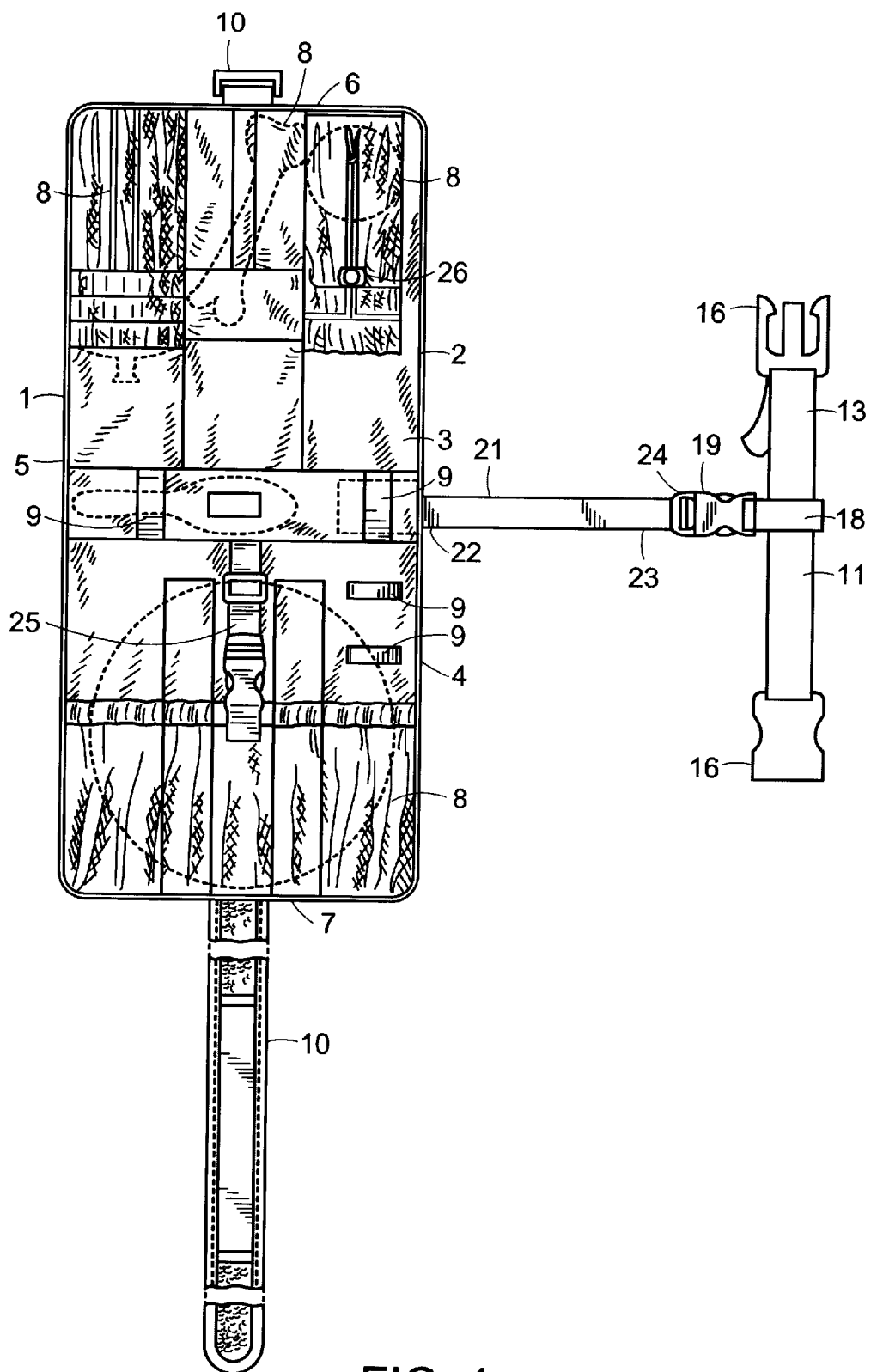
FIG. 1 is a top view of one of the embodiments of the dog pack harness.
Figure 3:
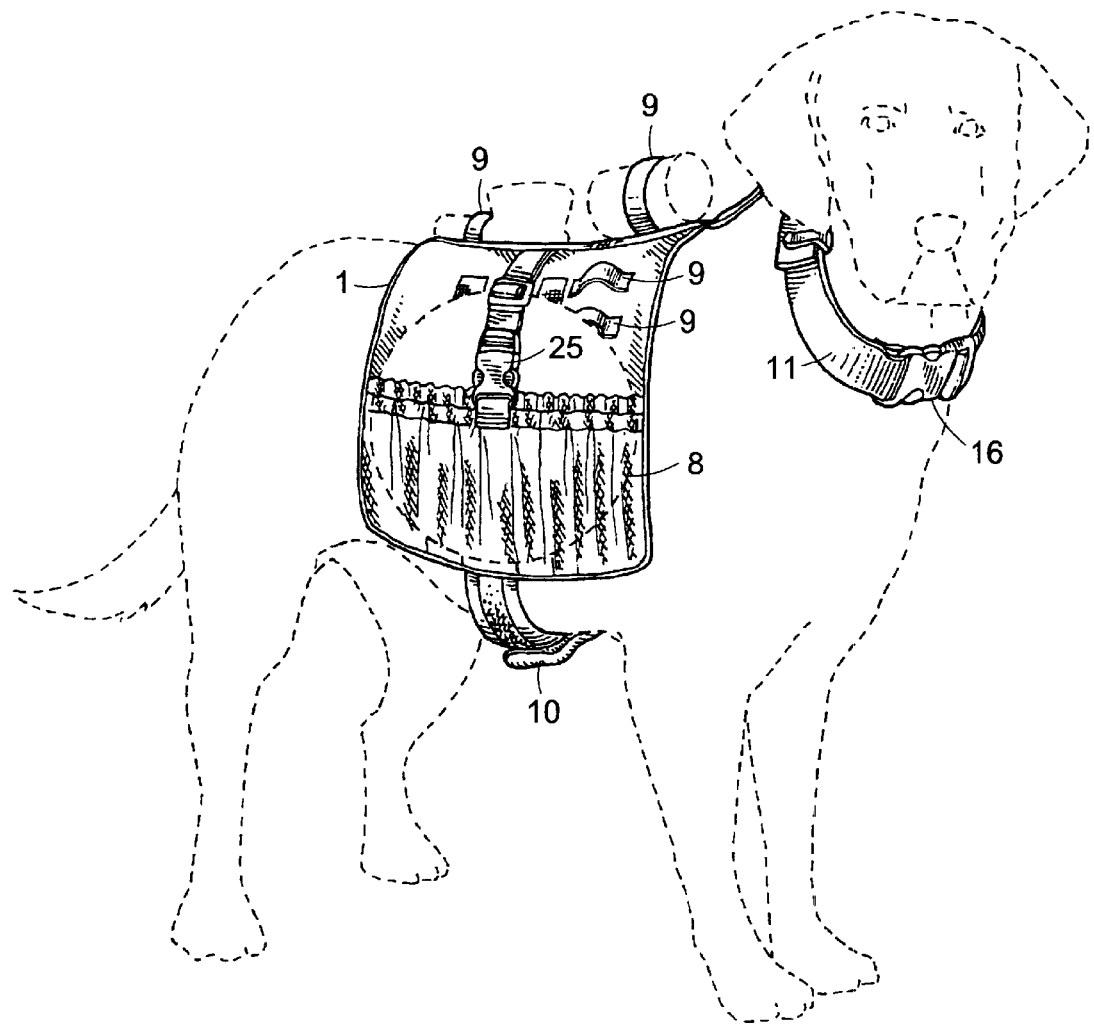
FIG. 3 is a side view of one of the embodiments of the dog pack harness.
Figure 4:
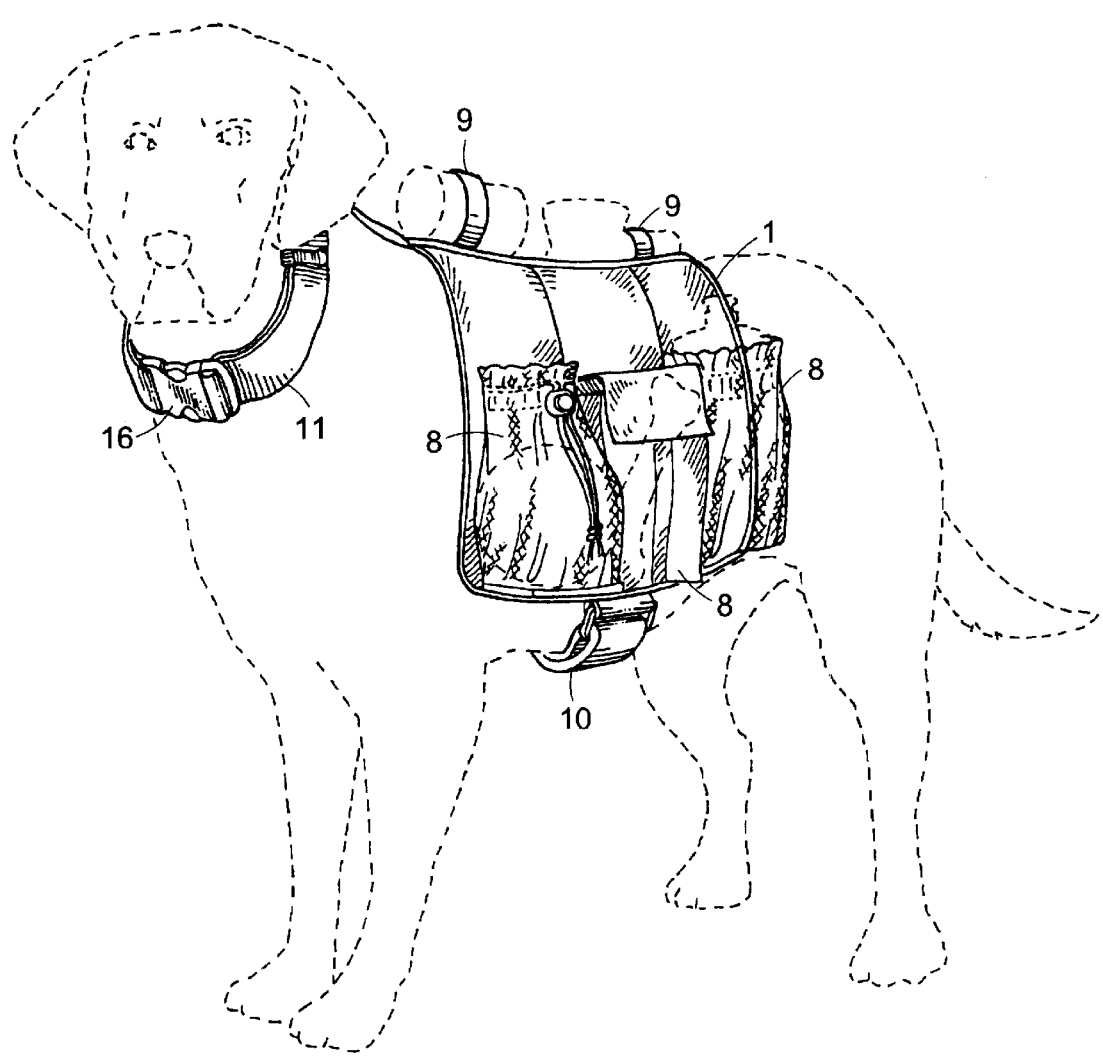
FIG. 4 is a side view of one of the embodiments of the dog pack harness.

The main component of the dog pack harness is the base member 1 which has an underside 2 and a top side 3, a left end 6 and a right end 7, as shown in FIG. 1. The base member 1 is worn on the back and sides of a dog with the underside 2 of the base element 1 in contact with the back and sides of the dog and the top side 3 facing outward as shown in FIGS. 3 & 4.

A plurality of pocket elements 8 are affixed to the top side 3 of the base member 1. The pocket elements 8 could vary in size and are there to provide means for storing various items desirable to be carried by a dog such as a water bottle, a dog toy, any dog medication, a FRISBEE to serve as both a toy and a makeshift water bowl, as well as a bag for storage of dog droppings.

A plurality of holding elements 9 well known in the art, such as loops could also be used for storage of various items such as a dog brush or a dog toy.

A ventral strap assembly means 10 is affixed to both the left end 6 and right end 7 of the base member. The ventral strap assembly means 10 is used to secure the base member 1 to the dog by wrapping the strap around the ventral part (chest area) of the dog as shown in FIGS. 3 & 4. The ventral strap assembly means 10 could be any type of strap assembly means well known in the art.

Figure 2:
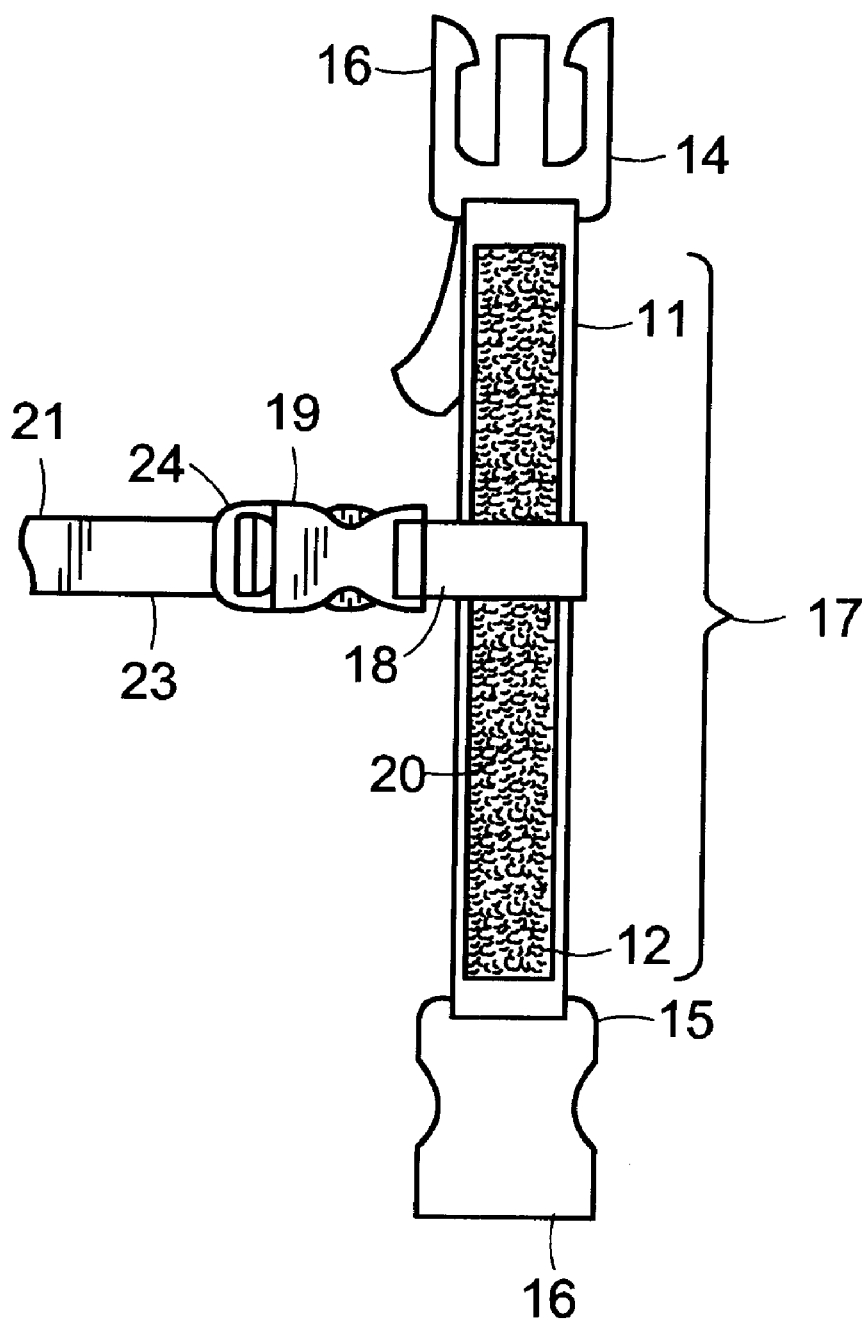
FIG. 2 is a bottom view of the collar element of the dog pack harness.

A collar element 11 is used to both secure the base element 1 to the dog as well as to provide an attachment for a leash. As shown in FIGS. 1 & 2, the collar element 11 has a first end 14 and a second end 15, as well as an intermediate section 17. The first end 14 and the second end 15 are equipped with a locking means 16 for securing the first end 14 to the second end 15. The locking means 16 could be any of the well know locking means such as a buckle. This allows for locking of a collar around the neck of a dog.

A collar attachment 18 is slidable along the length of the collar element 11 and it could be a loop of material going around the width of the collar element 11. The collar attachment 18 has a locking extension 19. A securing means 20 is positioned on the intermediate section 17 of the collar element 11 as well as on the collar attachment 18. The securing means 20 could be any of the well known securing means such as hooks and loops. When the securing means 20 is disengaged, the collar attachment 18 is free to slide along the length of the collar element 11. This freedom of movement allows for adjustment to different sized dogs wherein the desired arrangement has the collar attachment 18 at the distance that is furthest away from the locking means 16. The collar attachment 18 could then be secured to the collar element 11 by engagement of the securing means 20. This feature allows the dog pack harness to be adaptable to different size dogs. The size of the dog determines the size of the neck of the dog, which in turn determines the necessary diameter of the collar element 11. Adjustment for the size of the neck of the dog changes the diameter of the collar element 11, shifting the position of the collar attachment 18 with relation to the securing means 20. If the securing means 20 is a buckle, then due to its weight it will naturally slide down and remain at the lowest part of the collar element 11 when it is worn on a dog. However, for reasons stated below, it is desirable to always keep the collar attachment 18 at the center of the back of the neck of the dog—a distance that is furthest away from the securing means 20.

A dorsal strap assembly means 21 is used to secure the base member 1 to the collar element 11. The dorsal strap assembly means 21 could be any of the well known in the art strap assembly means. The dorsal strap assembly means 21 has a first end 22 secured to the front end 4 of the base element 1, and it has a second end 23 equipped with a locking means 24 well known in the art. The locking means 24 is used to secure the dorsal strap assembly means 21 to a locking extension 19 of the collar attachment 18. Thus, it becomes necessary to keep the locking extension 18 centered on the back of the neck of the dog to keep the dorsal strap assembly 21 centered on the back of the dog, and in turn securing the base member 1 centered on the back of the dog.

For improved containment of the contents of the pocket elements 8, a pocket securing means 26 could be incorporated, as shown in FIGS. 1 & 3.

DESCRIPTION OF THE PREFERRED EMBODIMENT

In the preferred embodiment of the invention, the base member 1 is made out of a light, flexible material. Some of the pocket elements 8 are made out of transparent flexible material to allow viewing of the contents of the pocket elements 8. The securing means 20 on the collar element 11 and the collar attachment 18 is a hook and loop means well known in the art. The locking means 24 securing the dorsal strap assembly means 21 to the collar attachment 18 is a buckle. The ventral strap assembly means 10 utilizes a hook and loop securing means to secure the dog pack harness on the body of the dog. At least one pocket element 8 is large enough to contain such item as a FRISBEE, and has a pocket securing means 25 such as an assembly of straps and buckles connecting the pocket element 8 to the base member 1 to better secure the contents of the pocket element 8 to the base member 1.

What is claimed is:

1. A dog pack harness comprising:
   a base member having an underside and a top side, a front end and a back end, and a left end and a right end;
   a plurality of pocket elements affixed to the top side of the base member;
   a plurality of holding elements affixed to the top side of the base member;
   a ventral strap assembly means for securing the base member to the dog, wherein the ventral strap assembly means is coupled to the left end and the right end of the base member;
   a collar element having a first and a second end and an intermediate section, wherein the first and the second ends are equipped with locking means for securing of the first end to the second end;
   a dorsal strap assembly means for securing of the base member to the collar element; and
   a collar attachment slidable along the length of the collar element and having a locking extension, wherein a securing means positioned on the intermediate section of the collar element and on the collar attachment allows for securing of the collar attachment at any point along the length of the intermediate section of the collar element.

2. The dog pack harness of claim 1 wherein:
   the dorsal strap assembly means has a first and a second end, wherein the first end of the dorsal strap assembly means is affixed to the front end of the base member, and wherein the second end of the dorsal strap assembly means has a locking means for securing of the second end of the dorsal strap assembly means to the locking extension of the collar attachment.

3. The dog pack harness of claim 1 wherein:
   the pocket elements have an opening and at least one of the pocket elements has a tightening means for closing of the opening of the pocket element.

4. The dog pack harness of claim 1 wherein:
   the ventral strap assembly means uses a hook and loop means for securing the base member to the dog.

5. The dog pack harness of claim 1 wherein:
   a securing means positioned on the intermediate section of the collar element and on the collar attachment is a hook and loop means.

6. The dog pack harness of claim 1 wherein:
   at least one of the pocket elements is made out of a transparent material.

7. The dog pack harness of claim 1 wherein:
   the locking means on the first and second ends of the collar element is a buckle.

8. The dog pack harness of claim 1 wherein:
   the locking means for securing the second end of the dorsal strap assembly means to the locking extension of the collar attachment is a buckle.

9. The dog pack harness of claim 1 wherein:
   a pocket securing means is used to contain items inside of at least one of the pocket elements.

10. A dog pack harness comprising:
    a base member having an underside and a top side, a front end and a back end, and a left end and a right end;
    a plurality of pocket elements affixed to the top side of the base member;
    a plurality of holding elements affixed to the top side of the base member;
    a ventral strap assembly means for securing of the base member to the dog, wherein the ventral strap assembly means is coupled to the left end and right end of the base member;
    a collar element having a first and a second end and an intermediate section, wherein the first and the second ends are equipped with locking means for securing the first end to the second end;

a collar attachment slidable along the length of the collar element and having a locking extension, wherein a securing means positioned on the intermediate section of the collar and on the collar attachment allows for securing the collar attachment at any point along the length of the intermediate section of the collar element;

a dorsal strap assembly means for securing the base member to the collar element, having a first and a second end, wherein the first end of the dorsal strap assembly means is affixed to the front end of the base member, and wherein the second end of the dorsal strap assembly means has a locking means for securing the second end of the dorsal strap assembly means to the locking extension of the collar attachment.

11. The dog pack harness of claim 10 wherein:

the pocket elements have an opening and at least one of the pocket elements has a tightening means for closing the opening of the pocket element.

12. The dog pack harness of claim 10 wherein:

the ventral strap assembly means uses a hook and loop means for securing the base member to the dog.

13. The dog pack harness of claim 10 wherein:

a securing means positioned on the intermediate section of the collar element and on the collar attachment is a hook and loop means.

14. The dog pack harness of claim 10 wherein:

at least one of the pocket elements is made out of a transparent material.

15. The dog pack harness of claim 10 wherein:

the locking means on the first and second ends of the collar element is a buckle.

16. The dog pack harness of claim 10 wherein:

the locking means for securing of the second end of the dorsal strap assembly means to the locking extension of the collar attachment is a buckle.

17. The dog pack harness of claim 10 wherein:

a pocket securing means is used to contain items inside of at least one of the pocket elements.

18. A dog pack harness comprising:

a base member having an underside and a top side, a front end and a back end, and a left end and a right end;

a plurality of pocket elements affixed to the top side of the base member;

a plurality of holding elements affixed to the top side of the base member;

a ventral strap assembly means for securing the base member to the dog, wherein the ventral strap assembly means is coupled to the left end and the right end of the base member;

a collar element having a first and a second end and an intermediate section, wherein the first and the second ends are equipped with locking means for securing of the first end to the second end;

a dorsal strap assembly means for securing of the base member to the collar element;

a collar attachment slidable along the length of the collar element and having a locking extension, wherein a securing means allows for securing of the collar attachment to the collar element at any point along the length of the intermediate section of the collar element.

19. The dog pack harness of claim 18 wherein:

the dorsal strap assembly means has a first and a second end, wherein the first end of the dersal strap assembly means is affixed to the front end of the base member, and wherein the second end of the dorsal strap assembly means has a locking means for securing of the second end of the dorsal strap assembly means to the locking extension of the collar attachment.

20. The dog pack harness of claim 18 wherein:

the pocket elements have an opening and at least one of the pocket elements has a tightening means for closing of the opening of the pocket element.

21. The dog pack harness of claim 18 wherein:

a pocket securing means is used to contain items inside of at least one of the pocket elements.

* * * * *